May 30, 1939.    C. F. HENNEY    2,160,733
REFRIGERATING APPARATUS
Filed Jan. 18, 1934
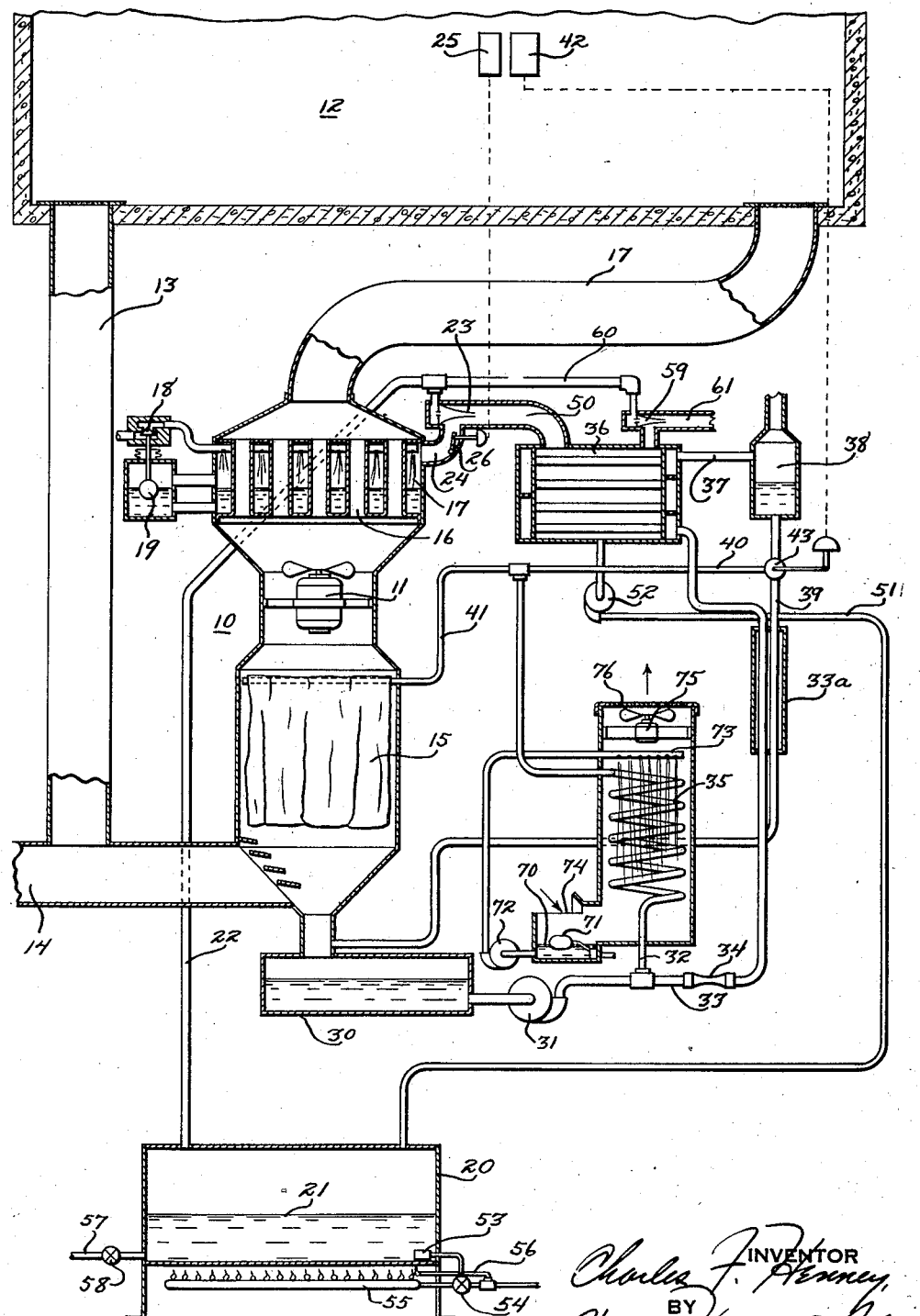

Patented May 30, 1939

2,160,733

UNITED STATES PATENT OFFICE 2,160,733

REFRIGERATING APPARATUS

Charles F. Henney, Dayton, Ohio, assignor to General Motors Corporation, Dayton, Ohio, a corporation of Delaware Application January 18, 1934, Serial No. 707,114

14 Claims. (Cl. 62—6)

This invention relates to refrigeration.

It is among the objects of this invention to provide a method and apparatus for conditioning a gas, such as air, by means of a combined evaporating system and hygroscopic system and in so coordinating the systems that desired conditions are maintained in the gas.

Further objects and advantages of the present invention will be apparent from the following description, reference being had to the accompanying drawing, wherein a preferred form of the present invention is clearly shown.

In the drawing there is shown diagrammatically one embodiment of the invention as applied to the conditioning of air for any space in general.

In practicing my invention, a gas to be conditioned is caused to flow through a conditioning zone or casing generally indicated at 10. In the embodiment shown in the drawing, the gas is caused to flow by means of a fan 11, and the gas may be supplied to the zone 10 either from an enclosure 12, through the pipe 13, or from the outside atmosphere, through the pipe 14, or selectively from both. In this particular embodiment, the gas is air for the enclosure 12. The gas flows through a gas and liquid contact means 15 and a cooling means 16 and then flows through the pipe 17' to the enclosure 12.

The cooling means 16 preferably includes an evaporator space 17 in which a first body of a volatile liquid, such as water is evaporated at a relatively low pressure, preferably sub-atmospheric. Liquid may be automatically supplied to the evaporator 17 by means of a valve 18 automatically controlled by a float 19 to maintain a substantially constant quantity of liquid in the evaporator. The liquid, as it evaporates, cools the air or gas as it passes in thermal contact therewith.

Means are provided for causing the first body of liquid to evaporate. In this particular embodiment, such means includes a boiler 20 in which a second body of volatile liquid 21 is changed into a vapor at a relatively higher pressure than the pressure in the evaporator 17. Preferably the second body of liquid 21 is identical with the liquid in evaporator 17, and therefore is also water, and is transformed into steam at a higher pressure than the water vapor in the evaporator 17. The steam from boiler 20 flows through a pipe 22 to a jet compressor 23 which maintains or creates a sub-atmospheric pressure in the evaporator 17 through the connection 24.

Preferably automatic means are provided for governing the evaporation of the liquid in the evaporator 17 in accordance with conditions in the apparatus. Thus a dry bulb thermostat 25 is placed in the enclosure 12 and automatically controls the position of the damper 26 to maintain proper dry bulb temperatures in the enclosure 12 or in the treated gas. When the dry bulb temperature rises in the enclosure 12, the damper 26 opens to provide more refrigeration or evaporation, and when the dry bulb temperature falls, the damper closes to reduce the amount of refrigeration or evaporation. By proper calibration, a substantially constant dry bulb temperature is maintained within any desired limits in the enclosure 12.

A hygroscopic medium is also placed in contact with the gas for the enclosure 12, and is coordinated with the refrigerating system so that the hygroscopic medium is properly reactivated. To this end, a hygroscopic liquid is circulated to and from the contacting apparatus 15. Thus a sump 30 is placed to receive the drain of hygroscopic liquid from the contact apparatus 15. A stream of liquid is caused to circulate by the pump 31 and is divided into two portions flowing through the pipes 32 and 33 respectively, pipe 33 being provided with a restrictor 34 to proportion correctly the amount of liquid flowing through the two pipes. The pipe 32 causes one portion of liquid to flow through the cooler 35 and the pipe 33 causes another portion of the liquid to flow through an interchanger 33a where the liquid is partially heated, then through the condensing means 36 where it is heated to its highest temperature and from whence it flows, through the pipe 37, to the flash chamber 38 where some of the constituent absorbed from the gas in apparatus 15 (in the preferred embodiment, water vapor) is removed by evaporation due to the heat introduced into the liquid. From thence the liquid flows either through the pipe 39 and interchanger 33a, where it is partially cooled, back to the sump 30, or through the pipe 40 to be mixed with cooled liquid from the cooler 35 and be discharged through the pipe 41 to the contact means 15. Obviously, the flow through the pipes 39 and 40 may be regulated so that all of the liquid may flow through either pipe, or variable portions may flow simultaneously through both pipes. Automatic means are provided for governing this flow of liquid. Thus a humidostat 42 is placed in enclosure 12 and governs a valve 43 to vary the flow of liquid through the pipes 39 and 40. The arrangement is such that the humidostat 42 controls the temperatures of the hygroscopic medium supplied to the apparatus 15 in accordance with conditions in the enclosure. Thus when the humidity increases in the enclosure 12, the temperature of the liquid supplied to the contact means 15 is decreased and when the humidity decreases, the temperature of the liquid thus supplied is increased. This tends to maintain the humidity in the enclosure 12 in any desired condition within any desired limits. The humidostat 42 may be made responsive to the relative humidity or the absolute humidity in any of the well known manners and may be, for instance, a well known dry bulb-wet bulb humidostat.

The discharge from the compressor 23 flows through pipe 50 to the condensing means 36 where condensation takes place. The heat of condensation is transferred to the hygroscopic liquid flowing through the condenser, while the condensed liquid from the compressor flows through the pipe 51 under the impulse of pump 52 to the boiler 20. Means are provided for automatically controlling the operation of the boiler in accordance with conditions in the apparatus. Thus thermostat 53 governs the fuel valve 54 and tends to maintain a substantially constant temperature in the boiler 20. The fuel burner 55 (which may be a gas burner) is ignited by the pilot 56 as is obviously apparent. A pipe 57 with a flow control means 58 is provided for feeding water to the boiler 20 if conditions require it and may be manually controlled or automatically controlled to maintain a proper water level in the boiler in the well known manner.

Means are provided for removing any inert gases from the refrigerating system. Thus a second jet compressor 59 is connected by the pipe 60 with the boiler 20. This compressor discharges any air or other inert gases through the pipe 61 from the condensing means 36. The steam used in operating jet 59 is discharged through pipe 61 with the result that water must be added to the system from time to time. Some water is added to the system during normal operation by the evaporator 17 and additional water may be added by the feed pipe 57, when necessary, as explained hereinabove.

Cooling means for the cooler 35 may be provided. Thus a body of water 70 is maintained at a proper level by the float valve 71 connected to the city water supply. Water from this sump is circulated by the pump 72 to the spray 73, from whence it flows over the coils in the cooler 35 and back to the sump 70. Air is caused to circulate into the air inlet 74 by means of the fan 75 and is discharged through the grilled opening 76 to any desired place, preferably outside of the building. This provides cooling water for cooling the hygroscopic liquid at substantially the wet bulb temperature of the atmosphere.

The operation of the apparatus is such that the gas to be conditioned is contacted with an absorbing medium at 15 and thermally exchanges heat with the evaporating liquid in the evaporator 17 and thence flows to the place of use. The relatively low refrigerant pressure is maintained in the evaporator 17 by means of the flow of vapor at a relatively higher pressure through the jet compressor 23. The discharge from the compressor 23 is condensed in the condensing means 36 where the heat of condensation heats the absorbing medium sufficiently to cause it to be concentrated in the flash chamber 38. The hygroscopic liquid supply to the contact means 15 is correctly governed as to temperature as heretofore described and thus tends to produce the proper humidity in the gas being conditioned. A portion of the hygroscopic liquid flows from the sump 30 through the cooler 35 and another portion flows through the condensing means 36. The portion flowing through the condensing means 36 is sufficient to maintain the average concentration of the liquid at the desired point.

The showing in the drawing is largely diagrammatic. In practicing applicant's invention, the air cooler which is of a well known type would obviously have to be designed with sufficient capacity for cooling the air passing therethrough to the proper temperature. It will be noted that some of the heat absorbed by the evaporator is removed in the condenser 36, and some is passed off along with the gases discharged through duct 61. The heat absorbed by the lithia in the heater 36 can, to a large extent, be absorbed by the air and water circulating through the cooling chamber 35. The capacity of the cooler 35 is unlimited as to volume of air and water. The capacity would, of course, be calculated for each particular installation. Likewise, the amount of lithia flowing to the contact means 15 would be determined by the amount of moisture which would have to be removed from the air from time to time on the particular installation. Hence, it is obvious that the above factors can be varied in almost unlimited extent so as to meet the requirements of practically any installation.

While the form of embodiment of the invention as herein disclosed constitutes a preferred form, it is to be understood that other forms might be adopted, all coming within the scope of the claims which follow.

What is claimed is as follows:

1. The method of conditioning a gas which comprises contacting said gas with a hygroscopic medium and thermally exchanging heat between said gas and an evaporating first body of a volatile liquid at a relatively low pressure, maintaining said relatively low pressure on said first body by means of vapor at a relatively higher pressure from a second body of a volatile liquid, and automatically varying the temperature of said hygroscopic medium in accordance with conditions of said gas.

2. An apparatus comprising a gas and liquid contacting means, a gas cooling means, a volatile refrigerant evaporator associated with said gas cooling means, a jet compressor connected to said evaporator, means for supplying a vapor under pressure to said jet compressor, condensing means for the discharge from said compressor, means for circulating a hygroscopic liquid to and from said contacting means and for passing a portion of said liquid through a cooler and another portion through said condensing means, and means for varying the flow of hygroscopic liquid from said condensing means.

3. An apparatus comprising a gas and liquid contacting means, a gas cooling means, a volatile refrigerant evaporator associated with said gas cooling means, a compressor connected to said evaporator, means for energizing said compressor, condensing means for the discharge from said compressor, means for circulating a hygroscopic liquid to and from said contacting means and for passing a portion of said liquid through a cooler and another portion through said condensing means.

4. An apparatus comprising a gas and liquid contact means, a gas cooling means including a water evaporator, a steam boiler, a jet compressor connected to said evaporator and said boiler, a condenser for the discharge from said compressor, means for circulating a hygroscopic liquid to and from said contact means including means for circulating hygroscopic liquid through said condensing means.

5. An apparatus comprising a gas and liquid contact means, a gas cooling means including a water evaporator, a steam boiler, a jet compressor connected to said evaporator and said boiler, a condenser for the discharge from said compressor, means for circulating a hygroscopic liquid to and from said contact means including means for circulating hygroscopic liquid through said condensing means, and means for automatically controlling the operation of said boiler in accordance with conditions in said apparatus.

6. An apparatus comprising a gas and liquid contact means, a gas cooling means including a water evaporator, a steam boiler, a jet compressor connected to said evaporator and said boiler, a condenser for the discharge from said compressor, means for circulating a hygroscopic liquid to and from said contact means including means for circulating hygroscopic liquid through said condensing means, and means for automatically controlling the operation of said evaporator.

7. An apparatus comprising a gas and liquid contact means, a gas cooling means including a water evaporator, a steam boiler, a jet compressor connected to said evaporator and said boiler, a condenser for the discharge from said compressor, means for circulating a hygroscopic liquid to and from said contact means including means for circulating hygroscopic liquid through said condensing means, and means for controlling the flow of said hygroscopic liquid.

8. An apparatus comprising a gas and liquid contact means, a gas cooling means including a water evaporator, a steam boiler, a jet compressor connected to said evaporator and said boiler, a condenser for the discharge from said compressor, means for circulating a hygroscopic liquid to and from said contact means including means for circulating hygroscopic liquid through said condensing means, and through a cooling means and means for varying the flow of hygroscopic liquid from said condensing means and from said cooling means to said contact means.

9. Air conditioning apparatus comprising, in combination, a gas contacting means, a sump adapted to contain hygroscopic liquid, means for concentrating a portion of said hygroscopic liquid, means for cooling another portion of said hygroscopic liquid, means for circulating a mixture of hygroscopic liquids from said cooling means and from said concentrating means to said contacting means, and means for varying said mixture.

10. The method of conditioning a gas which comprises, concentrating one portion of a hygroscopic medium, cooling another portion of a hygroscopic medium, contacting said gas with a mixture of said concentrated and said cooled hygroscopic medium, and varying the proportions of said mixture in accordance with the psychrometric condition of the gas.

11. The method of conditioning a gas which comprises contacting said gas with an absorbing medium and thereafter thermally exchanging heat between said gas and an evaporating first body of water at sub-atmospheric pressure, converting into steam at a higher pressure a second body of water, expanding said steam, and utilizing said steam to maintain said sub-atmospheric pressure on said first body of water and to reactivate said absorbing medium.

12. An apparatus comprising a gas and liquid contacting means, means for circulating a hygroscopic liquid to and from said contacting means so as to remove moisture from said gas, means responsive to the humidity of the gas for controlling the removal of moisture from the gas, a gas cooling means, a water evaporator associated with said gas cooling means, a jet compressor connected to said evaporator means supplying steam under pressure to said jet compressor, and means whereby heat from said steam is used in regenerating said hygroscopic liquid.

13. The method of conditioning a gas which comprises first contacting said gas with a hygroscopic medium so as to remove moisture from said gas and thereafter thermally exchanging heat between said gas and an evaporating first body of water at a relatively low pressure, maintaining said relatively low pressure on said first body by means of steam at a relatively higher pressure from a second body of water, condensing said steam, and utilizing heat given off by said steam during said condensing operation for reactivating said hygroscopic medium.

14. The method of conditioning gas from an enclosure which comprises, flowing gas to be conditioned over a hygroscopic medium so as to remove moisture from said gas, flowing gas to be conditioned over a cooling element, maintaining said element cool by evaporating a first body of water at a relatively low pressure, maintaining said low pressure on said first body by means of steam at a relatively higher pressure from a second body of water, condensing said steam, utilizing the heat of condensation for regenerating said hygroscopic medium, and controlling the removal of moisture in response to humidity conditions in said enclosure.

CHARLES F. HENNEY.